(No Model.)

F. B. & J. T. KENDALL.
CORN SHOCKER.

No. 476,389. Patented June 7, 1892.

Witnesses
O. J. Williamson
A. L. Hough

Inventors
Francis B. and
John T. Kendall
by Franklin H. Hough
Atty.

UNITED STATES PATENT OFFICE.

FRANCIS B. KENDALL AND JOHN T. KENDALL, OF MONMOUTH, ILLINOIS, ASSIGNORS, BY DIRECT AND MESNE ASSIGNMENTS, OF ONE-HALF TO MYRON A. GIDDINGS AND CHARLES CROSIER, AND SAID JOHN T. KENDALL ASSIGNOR OF HIS REMAINING ONE-FOURTH INTEREST TO SAID FRANCIS B. KENDALL, MYRON A. GIDDINGS, AND CHARLES CROSIER, ALL OF SAME PLACE.

CORN-SHOCKER.

SPECIFICATION forming part of Letters Patent No. 476,389, dated June 7, 1892.

Application filed July 18, 1891. Serial No. 399,953. (No model.)

*To all whom it may concern:*

Be it known that we, FRANCIS B. KENDALL and JOHN T. KENDALL, citizens of the United States, residing at Monmouth, in the county of Warren and State of Illinois, have invented certain new and useful Improvements in Corn-Shockers; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in shocking attachments for corn and other harvesting machines; and it has for its object to generally improve upon the construction and render more serviceable in operation this class of appliances.

To these ends and to such others as the invention may pertain the same consists in the peculiar construction and in the novel combination, arrangement, and adaptation of parts, all as more fully hereinafter described, shown in the accompanying drawings, and then specifically defined in the appended claim.

The invention is clearly illustrated in the accompanying drawings, which, with the letters of reference marked thereon, form a part of this specification, like letters of reference indicating the same parts throughout the several views, and in which drawings—

Figure 1:
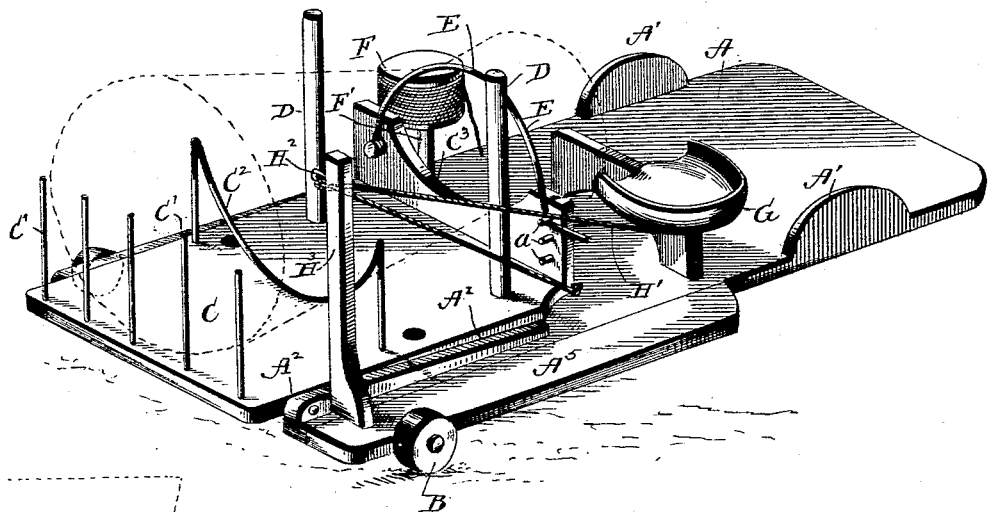
Figure 2:
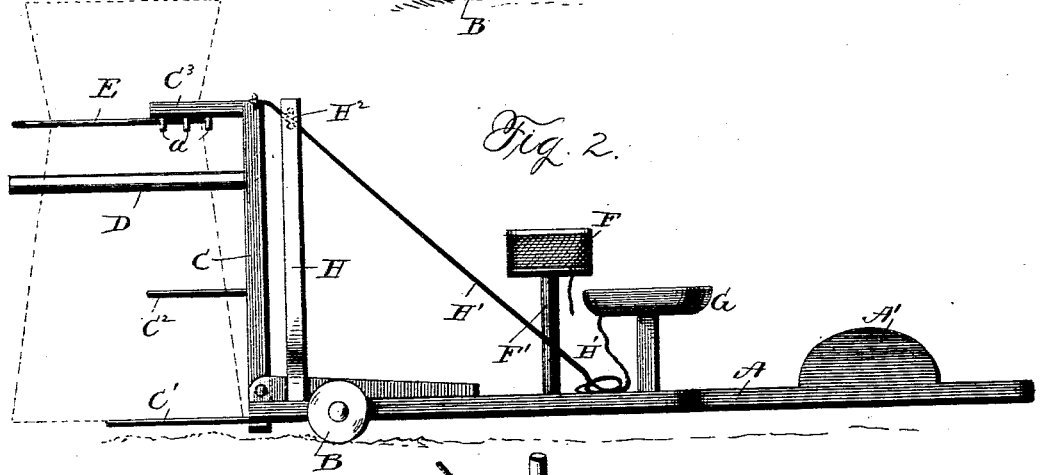
Figure 3:
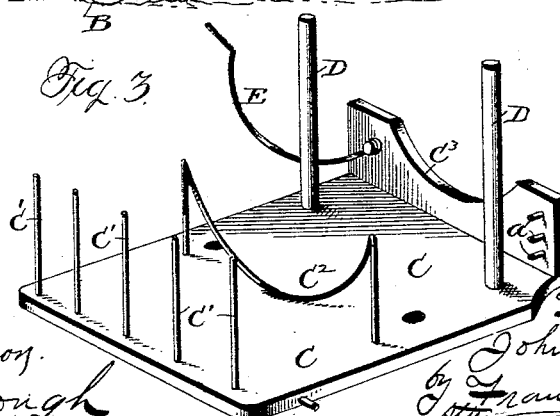

Figure 1 is a perspective view of a shocking-machine constructed in accordance with our invention. Fig. 2 is a side view showing the tilting platform in the position which it assumes at the moment of delivering the completed shock. Fig. 3 is an enlarged detail in perspective of the tilting platform.

Reference now being had to the details of the drawings by letter, A designates a platform mounted upon low wheels or rollers B B and adapted to be attached in any suitable manner to the side of a grain-harvester. At its forward end the platform A is provided at its outer edges with uprights A', between which the grain is deposited as it is delivered from the harvester. At the opposite or rear end of the platform A is formed a recess $A^2$, and within this recess is hinged one end of the supplemental platform C, which platform is adapted to normally fold down and rest upon the upper face of the platform A.

Rising from the rear end of the platform C are a number of rods C' C', against which the butts of the stalks or grain are placed in forming the shock. The platform is provided with suitable formers $C^2$ and $C^3$, and at a point adjacent to the front end of the said platform uprights D are provided, one adjacent to each of the outer edges of the platform, for a purpose which will presently appear. To the rear former $C^3$ is hinged one end of a curved rod E, which rod is adapted to be drawn down over the mass of stalks or grain within the formers and have its free end secured beneath projecting pins $a$, thus serving to securely bind together the shock until it shall have been properly tied.

At a point slightly in advance of the front end of the hinged platform and near one of the outer edges of the platform A is sleeved upon a vertical standard F' a spool F, upon which is wound the twine used in binding the shock, and near the opposite edge of the platform is placed a seat G. It will be observed that by this arrangement the seat of the operator is so located as to permit the person occupying the seat to readily transfer the grain from the front end of the platform, where it is deposited by the harvester, to the formers upon the hinged platform.

When a sufficient amount of grain or stalks has been placed within the formers upon the hinged platform to form a shock of the desired size, the operator draws down the curved hinged rod E and secures its free end beneath one of the pins $a$. While the shock is thus held together he binds the same. The operator pulls upon the cord H', one end of which cord is secured to the front corner of the hinged platform upon the side adjacent to the seat G, and from its point of attachment to the platform said cord is passed over a pulley H² at the upper end of the standard H³, which rises from the rear end of the platform A, and the opposite end of the said cord is secured to the seat G. It will thus be seen that by pulling upon the cord H' the platform C will be dumped or tilted. The butts of the grain or stalks forming the shock resting upon the rods C', the shock is supported thereby, while the uprights D serve to prevent the shock from falling to either side and insure its being left in an upright position upon leaving the platform C. As soon as the shock has slid off from the supporting-rods C' the platform will fall back to its normal position by gravity, and will thus be in readiness to receive another shock.

In case it should at any time be found necessary for the operator to steady the shock as it leaves the hinged platform, as might be the case upon uneven ground, I provide the platform A with a side extension A⁵, which serves as a walk upon which the operator may pass to the rear end of the platform.

Having thus described our invention, what we claim to be new, and desire to secure by Letters Patent, is—

The combination, with the platform, of the hinged supplemental platform provided with formers, and a hinged curved rod on the rear former and having a horizontal portion to engage pins on said former, and vertical rods C' at one end of the supplemental platform and uprights D at the other end, substantially as and for the purpose described.

In testimony whereof we affix our signatures in presence of two witnesses.

FRANCIS B. KENDALL.
JOHN T. KENDALL.

Witnesses:
   CHAS. CROSIER,
   CASPER GALLOWAY.